United States Patent [19]

Richardt

[11] Patent Number: 4,986,042

[45] Date of Patent: Jan. 22, 1991

[54] BORDER AND LANDSCAPING BRICKS

[76] Inventor: Anton Richardt, 850 Talmadge Ave., Wickliffe, Ohio 44092

[21] Appl. No.: 359,650

[22] Filed: May 31, 1989

[51] Int. Cl.$^5$ .................... E02D 27/00; A01G 1/00
[52] U.S. Cl. .......................... 52/102; 47/33; 404/7
[58] Field of Search ............. 52/102; 47/33; 404/7, 404/8

[56] References Cited

U.S. PATENT DOCUMENTS

| | | |
|---|---|---|
| 433,219 | 7/1890 | Schwartz . |
| 1,916,414 | 7/1933 | Schrickel . |
| 2,062,979 | 12/1936 | Walmsley ................. 52/102 |
| 2,471,226 | 5/1949 | Maccario ................. 404/7 |
| 2,826,393 | 3/1958 | Miller ..................... 52/102 |
| 2,888,779 | 6/1959 | Hostetter . |
| 2,994,255 | 8/1961 | Trief ....................... 404/7 |
| 3,087,279 | 4/1963 | Thompson . |
| 3,092,371 | 6/1963 | Knudsen ................. 404/6 |
| 3,157,098 | 11/1964 | Mason ..................... 404/7 |
| 3,289,349 | 12/1966 | Valdez . |
| 3,415,013 | 12/1968 | Galbraith . |
| 3,777,421 | 12/1973 | Bomba et al. . |
| 4,059,362 | 11/1977 | Smith ..................... 404/6 |
| 4,336,932 | 6/1982 | Steiner ................... 52/102 |

FOREIGN PATENT DOCUMENTS

| | | | |
|---|---|---|---|
| 1553954 | 1/1969 | France ................................ 404/8 |
| 2470192 | 6/1981 | France ................................ 404/7 |
| 318902 | 8/1969 | Sweden ............................... 404/7 |
| 683336 | 11/1952 | United Kingdom ................. 404/7 |
| 2099477 | 12/1982 | United Kingdom ................. 52/102 |

Primary Examiner—Henry E. Raduazo
Attorney, Agent, or Firm—Tarolli, Sundheim & Covell

[57] ABSTRACT

A landscape border brick system includes a plurality of bricks and a plurality of connectors for interconnecting bricks which are placed end to end. Each brick has connector recesses formed in its opposite ends for receiving the connectors. The connector recesses are formed in the bottom surface of the brick which rests on the ground, so a brick can be lifted off its connectors and replaced without disturbing adjacent bricks. The system includes two basic kinds of bricks, main bricks and secondary bricks. The main or angled bricks have a pair of leg portions which intersect at an angle, preferably 30 degrees, to form a generally V-shaped configuration when viewed from above. The secondary bricks are straight and may be interposed between the main bricks in any desired arrangement. Both the main bricks and the secondary bricks may be provided in varying lengths. With different combinations of bricks it is possible to form landscape borders which approximate such shapes as circles, squares, ovals, and other shapes, all of varying sizes. Joint protectors which function as imitation mortar joints are preferably placed between adjacent bricks.

2 Claims, 6 Drawing Sheets

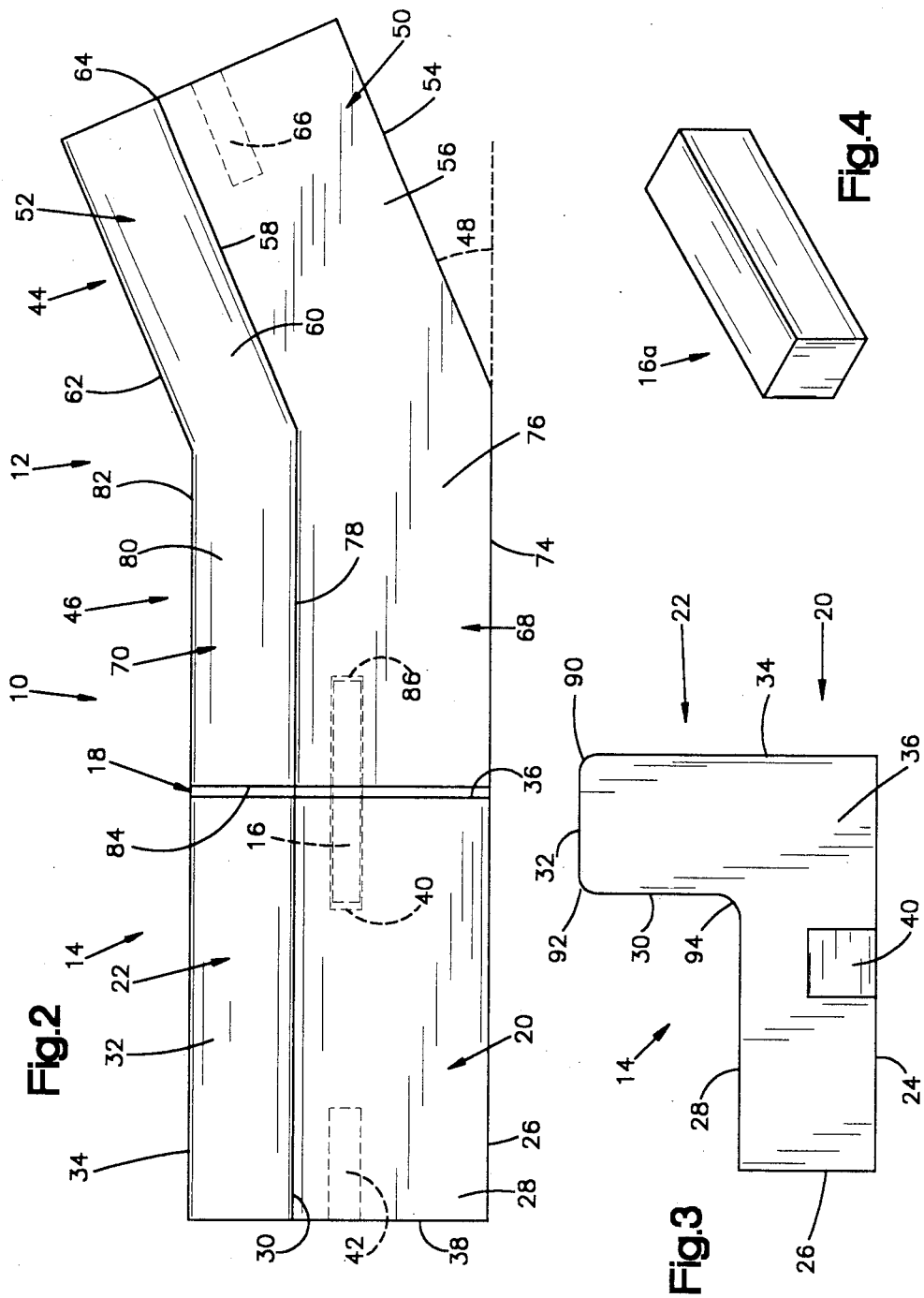

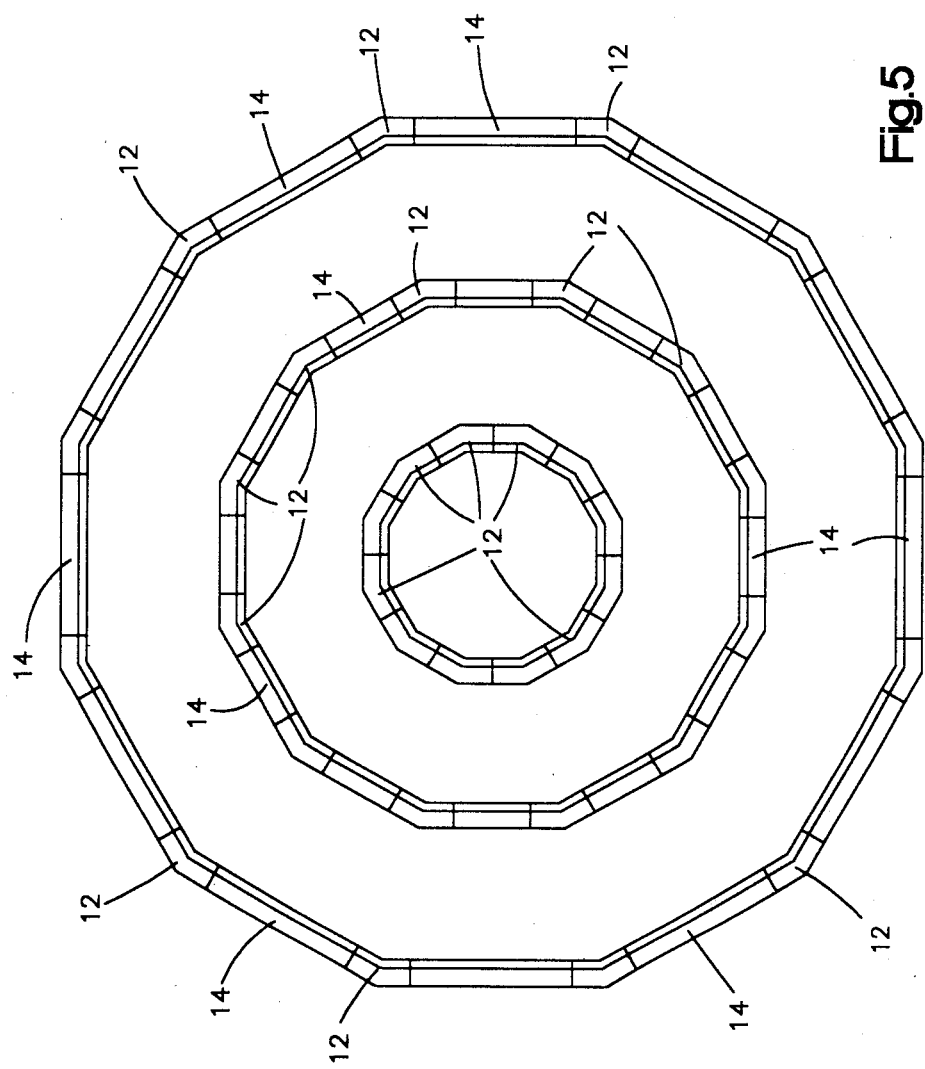

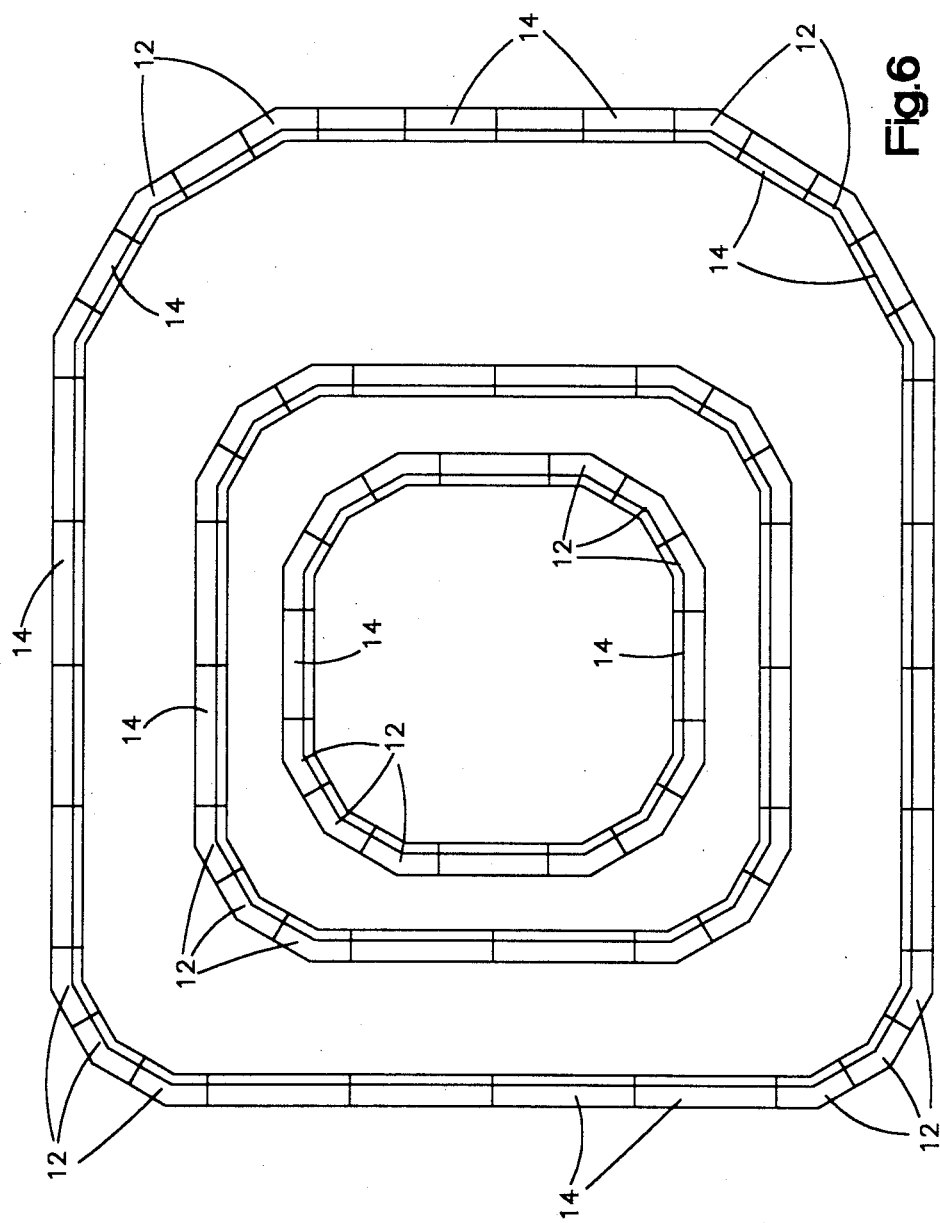

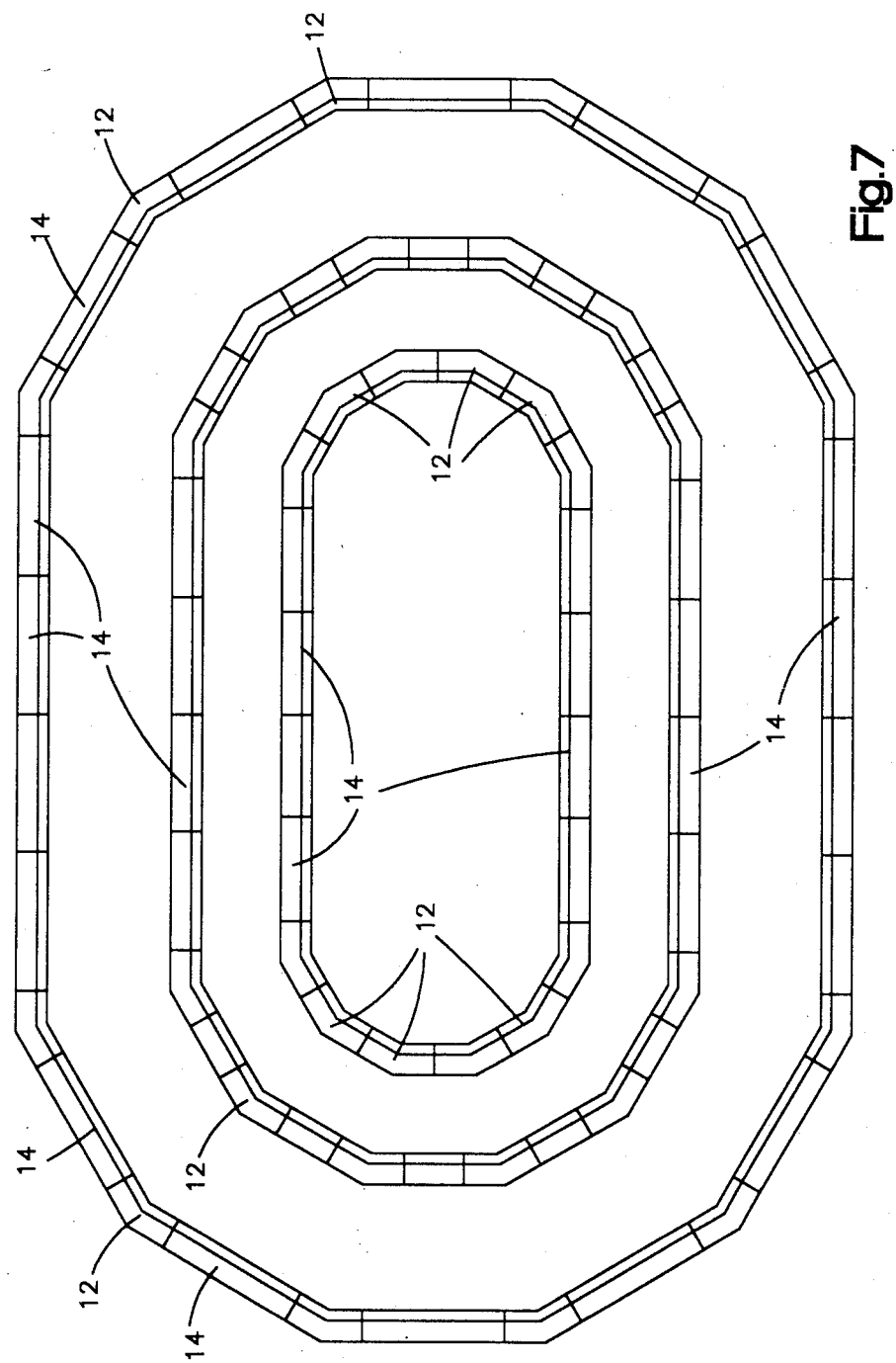

BORDER AND LANDSCAPING BRICKS

BACKGROUND OF THE INVENTION

1. Technical Field

This invention relates to border and landscaping bricks. More particularly, this invention relates to bricks which can be placed on the ground to create borders of varying shapes and sizes in a landscape.

2. Prior Art

There are many known types of landscape border bricks and brick systems. In some of these systems, the bricks are interconnectable so as to prevent the bricks from moving or being dislodged once they have been placed in the desired location, while in some systems the bricks are not so interconnectable. Some systems provide the ability to construct landscape borders of varying sizes and shapes, while others are more limited in their use. No known system provides the ability to construct landscape borders of varying sizes and shapes using only a minimum number of different bricks, while also allowing the bricks to be lifted and replaced even though they are interconnected to prevent the bricks from moving or being dislodged once they have been placed in the desired location.

SUMMARY OF THE INVENTION

A landscape border brick system in accordance with the present invention includes a plurality of bricks and a plurality of connectors for interconnecting bricks placed end to end. Each brick has a major side surface for placement on the ground; a pair of end surfaces intersecting the major side surface; and connector recesses formed in the ends of the brick at the intersections of the first major side surface and the end surfaces for receiving the connector therein. The connector recesses are formed in the surface of the brick which rests on the ground, so the bricks can be simply lifted off the connectors and replaced without disturbing adjacent bricks. Joint protectors which also function as imitation mortar joints are preferably placed between adjacent bricks.

The system includes two basic kinds of bricks, main bricks and secondary bricks. The main or angled bricks have a pair of leg portions which intersect at an angle to form a brick which is of a generally V-shaped configuration when viewed from above. The angle in the main brick is preferably 30 degrees. The secondary bricks are straight. Both the main bricks and the secondary bricks may be provided in varying lengths. The secondary bricks may be interposed between the main bricks in any desired arrangement. With a system of the present invention it is possible, using only one size main brick and a few different length secondary bricks, to form landscape border shapes which approximate such shapes as circles, squares, ovals, and other shapes, all of varying sizes. For example, a "circle" may be formed with twelve main bricks each having an included angle of 30 degrees, and the same twelve bricks, with straight bricks interposed therebetween, can form other circles of any larger size.

BRIEF DESCRIPTION OF THE DRAWINGS

Further features of the present invention will become apparent to those skilled in the art to which the present invention relates from reading the following specification with reference to the accompanying drawings, in which:

FIG. 2 is a plan view of the system of FIG. 1;

FIG. 3 is an end view of the secondary brick of FIG. 1, the end view of the main brick of FIG. 1 being the same;

FIG. 4 is a view of a connector having a square configuration;

FIG. 5 is a schematic plan view of how the system of the present invention can be used to form a plurality of different sized borders of generally circular shape;

FIG. 6 is a schematic plan view of how the system of the present invention can be used to form a plurality of different sized borders of generally square shape;

FIG. 7 is a schematic plan view of how the system of the present invention can be used to form a plurality of different sized borders of generally oval shape.

DESCRIPTION OF PREFERRED EMBODIMENTS

Figure 1:
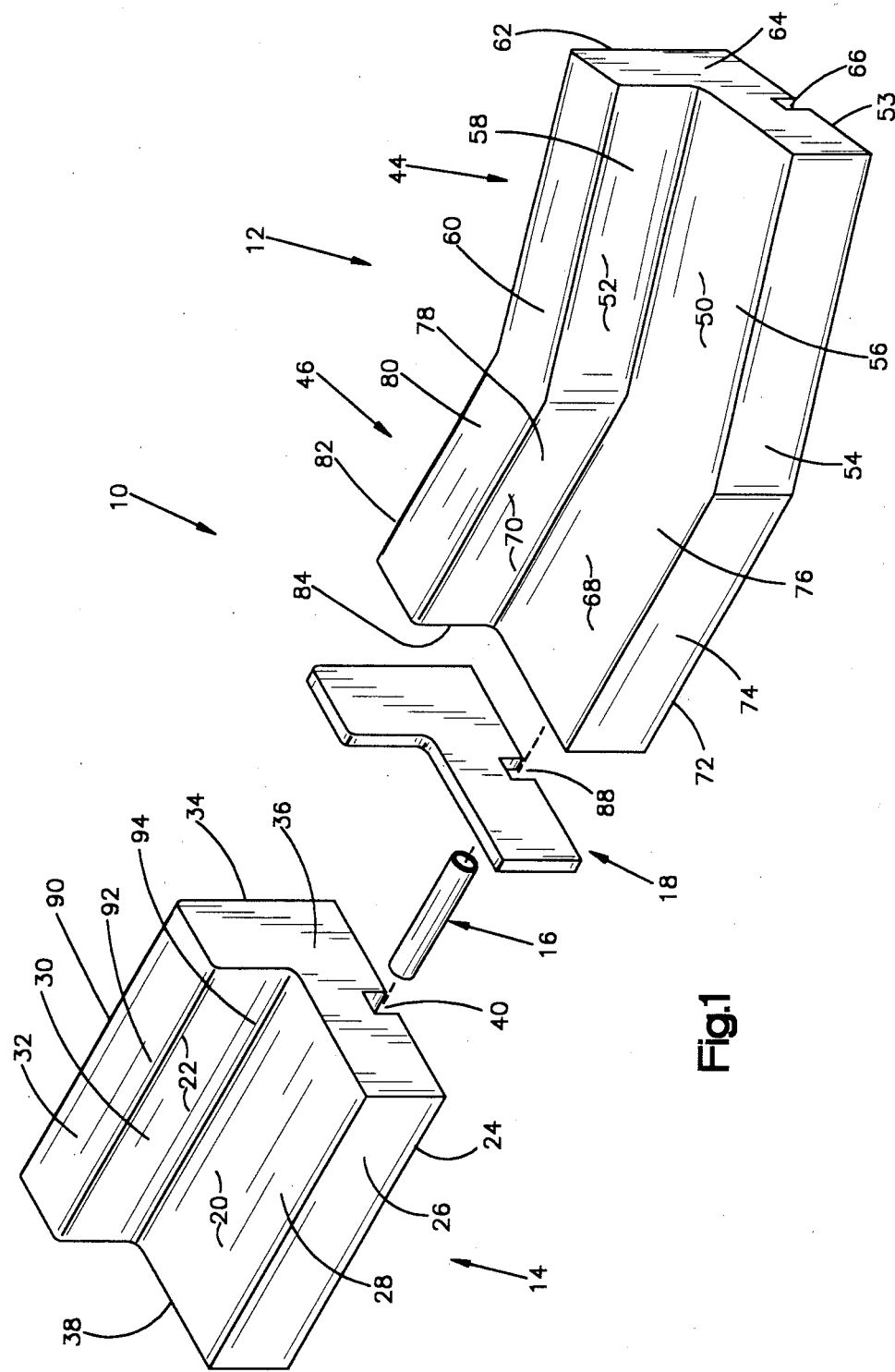
FIG. 1 is an exploded three-dimensional view of a landscape border brick system in accordance with the present invention including a main brick, a secondary brick, a connector having a circular configuration, and a joint protector.

FIG. 1 is an exploded view of a landscape border brick system 10 in accordance with the present invention. The system 10 includes a main brick 12, a secondary brick 14, a connector 16, and a joint protector 18. The system 10 shown in FIG. 1 is simplified for purposes of illustrating the various features of the present invention. It should be understood that the illustrated system 10 includes only two bricks for ease of easy understanding of the invention; a system actually used would, of course, incorporate more bricks.

The secondary brick 14, which is straight, includes a ground engaging portion 20 and an upstanding portion 22 which extends from the ground engaging portion 20. The ground engaging portion 20 is adapted to be placed on the ground on which the system 10 is used to form a landscape border. The upstanding portion 22 serves, preferably, as a border on the inside of the shape formed by the system 10, around, for example, a tree or a flower bed. The ground engaging portion 20 has a bottom or first major side surface 24 (see also FIG. 3) which rests on the ground. The ground engaging portion 20 also includes a front surface 26 and a upper surface 28 extending the length of the brick. The upstanding portion 22 includes a front surface 30 and an upper surface 32, also extending the length of the brick. The secondary brick 14 includes a back surface 34. These longitudinally extending surfaces extend between a first end surface 36 and a second end surface 38 of the brick 14.

The secondary brick 14 has a pair of identical connector recesses 40 and 42 (see also FIG. 2) formed therein. The connector recess 40 extends through the first end surface 36 and also through the first major side surface 24 of the brick 14. The connector recess 42 extends through the second end surface 38 and also through the first major side surface 24 of the brick 14. The connector recesses 40 and 42 are located in the ground engaging portion 20 of the brick 14. The connector recesses 40 and 42 are symmetrically located in the brick 14, that is, they are equally positioned along the mirror-image end surfaces 36 and 38 of the brick 14. Other than the connector recesses 40 and 42, the brick 14 has a uniform cross-section throughout its longitudinal extent.

The main brick 12 (FIG. 1) has a similar cross-sectional configuration to that of the secondary brick 14. Thus, a main brick 12 and a secondary brick 14 joined end to end will present a uniform structure. The main brick 12 is, however, angled, having two leg portions 44 and 46 with an included angle 48 therebetween. In the preferred embodiment, the included angle 48 is 30°. Thus, the brick 12 has a generally V-shaped configuration when viewed from above.

The first leg portion 44 of the main brick 12 includes a ground engaging portion 50 and an upstanding portion 52. The ground engaging portion 50 has a bottom or first major side surface 53, a front surface 54, and an upper surface 56. The upstanding portion 52 has a front surface 58 and an upper surface 60. A back surface 62 extends longitudinally along the length of the first leg portion 44 of the main brick 12. A first end surface 64 is disposed at one end of the main brick 12. A connector recess 66 is formed in the first end surface 64 and in the first major side surface 53. The connector recess 66 is similar to the connector recesses 40 and 42 in the secondary brick 14.

The second leg portion 46 of the main brick 12 is a mirror image of the first leg portion 44. The second leg portion 46 includes a ground engaging portion 68 and an upstanding portion 70. The ground engaging portion 68 has a bottom or first major side surface 72, a front surface 74, and a top surface 76. The upstanding portion 70 has a front surface 78 and a top surface 80. The second leg portion 46 also includes a back surface 82, an end surface 84, and a connector recess 86 (FIG. 2) identically formed to the other connector recesses.

The connector 16 (FIG. 1) which connects adjacent bricks is preferably of a circular cross-sectional configuration as shown in FIG. 1. The connector 16 is sized to fit the connector recesses 40, 42, 66, and 86, which are all the same size. The connector 16 is sized so that when it is received in adjoining connector recesses of adjoining bricks, relative movement between the adjoining bricks in a direction transverse to the longitudinal axis of the bricks, is substantially blocked. The connector 16 is shown in FIG. 1 as having a circular cross-section. Optionally, the connector 16 may have square configuration, as shown by the connector 16a illustrated in FIG. 4. Or, other shapes of connector 16 may be provided.

The system 10 also includes a joint protector 18 (FIGS. 1 and 2). The joint protector 18 is optionally but preferably fitted between adjacent bricks when placed in position. The joint protector 18 is of the same cross-sectional configuration as the bricks. As can be seen in FIG. 1, the joint protector 18 includes an opening 88 through which the connector 16 extends. The joint protector 18 prevents respective end surfaces on respective adjoining bricks from engaging each other, thereby preventing damage to the edges of the bricks. When placed between adjacent bricks, the joint protector 18 also functions as an imitation mortar joint. Thus, the joint protector 18 is preferably of a different color than the bricks, to stand out therefrom and provide a professional artistic appearance. The joint protector 18 may be provided in different colors. The joint protector 18 is preferably glued or otherwise secured to the respective end surface of an adjoining brick. If a narrow-appearing mortar joint is desired, only one joint protector 18, approximately 1/16" to $\frac{1}{8}$" thick, is used, while if a wide-appearing mortar joint is desired, a joint protector on both adjoining brick end surfaces is used. The color contrast between the joint protector and the adjacent bricks is important to put art into the landscaping.

The main brick 12 and the secondary brick 14 are preferably made of the same material in order to provide a uniform appearance to an installed system 10. The preferred material for making the bricks of the present invention is cement, by which the bricks can be easily molded. The bricks 12 and 14 may be provided in varying colors, for example, gray, yellow, red, and white. The connector 16, in a preferred embodiment, is plastic pipe, although it may be made of any suitable material having sufficient strength. The joint protector 18 is made of a material which is softer than the material of which the bricks are made, in order to protect the edges and ends of the bricks. The joint protector 18 may, for example, be made of a material such as hardboard or of any other material which functions suitably as a joint protector and also has the appearance of an imitation mortar joint.

As noted above, the included angle 48 between the two leg portions 44 and 46 of the main brick 12 is preferably 30°. Applicant has found that with this included angle of 30°, a total of twelve main bricks 12 placed end to end would form a closed polygon approximating the shape of a circle. The 30° angle is also $\frac{1}{3}$ of a right angle, so that three bricks 12 placed end to end will define a 90° corner. This 90 degree corner may be used to form the corner or turn of any shape such as a circle or square. Six bricks 12 may be used to define a 180° turn. In any shape, using twelve main bricks 12 which have a 30 degree included angle, spaced anywhere about the periphery of the shape, will provide a total 360 degree turn. The 30° angle is therefore chosen because of this great variety of regular shapes formable with just the one main brick and some secondary bricks of different lengths. It should be understood, however, that the invention contemplates the use of other included angles. For example, a ten-point circle could be made with ten bricks each having a 36 degree included angle, while a fifteen-point circle could be made with fifteen bricks each having a 20 degree included angle. This is again demonstrative of the great variety, simplicity, and ease of construction available with a system in accordance with the present invention.

The remaining dimensions of the various portions of the bricks 12 and 14 are not critical, so long as each brick maintains a generally uniform cross section and all the bricks have the same cross section. In a preferred embodiment, a secondary brick 14 has a front-to-back depth, i.e., between surface 26 and surface 34, of 6". The connector recess 40 is one inch square and 3$\frac{1}{2}$" long and is centered front to back in the brick. The ground engaging portion 28 is 2" tall, and the overall brick is 4$\frac{3}{8}$" tall. The upstanding portion 22 is 2" thick from front to back. Some of the corners of the bricks are preferably rounded. Accordingly, corner 90 which is the intersection between the back surface 34 and the top surface 32 has a $\frac{1}{4}$" radius, as well as corner 92 which is the intersection between the top surface 32 and the front surface 30. The corner 94, which is the intersection between the front surface 30 and the top surface 28, has a $\frac{3}{8}$" radius.

The main brick 12 is similarly dimensioned to the secondary brick 14 in cross-sectional configuration, so that the two bricks may be placed end to end and interconnected with a connector 16 and present a uniform appearance. The main brick 12 is preferably provided in two sizes, one of an overall length (inside corner to inside corner) of 12¼" and one of an overall length of 15¼". In the 12¼" brick, each leg portion 44 and 46 is approximately 8" long along its front surface 54 and 74, respectively.

Since the connector recesses in the various bricks are formed in the bottom of the bricks, when the system 10 is installed one brick may be lifted off its connector 16 and replaced without disturbing adjacent bricks. This feature allows for greatly increased ease of assembly of various systems, repair or replacement of broken parts, and changing of an installed system.

Both the main brick 12 and the secondary brick may be provided in different lengths. This feature simplifies the formation of installations of different sizes with a minimum number of bricks. As an example, FIG. 5 illustrates schematically the construction of varying sized borders approximately in the shape of circles. The circles are constructed from a plurality of main bricks and, for the larger circles, a plurality also of secondary bricks. The smaller circles are shown as being constructed from a plurality of main bricks only. In particular, the smallest circle, a twelve-point circle, is constructed from twelve main or angled bricks alone. The next larger circle is constructed from twelve main bricks and twelve secondary bricks. Larger circles than these are formed of main bricks and one or more secondary bricks of different lengths between adjacent main bricks. It is readily apparent to one of ordinary skill in the art how the particular shapes are constructed and such therefore need not be explained in further detail herein.

FIG. 6 illustrates schematically the construction of shapes approximating a square, of varying sizes. The larger squares include more and longer secondary bricks between main bricks, while the smaller sizes use a greater proportion of main bricks as compared to secondary bricks. FIG. 7 illustrates the construction of shapes approximating that of an oval, of varying sizes. The ends of the ovals are constructed in the shape of a circle, similar to that of FIG. 5, while the intermediate portions include a plurality of secondary or straight bricks placed end to end. In all embodiments of the invention shown, the bricks are connected by a plurality of connectors 16. Again, it is readily apparent to one of ordinary skill in the art how the particular shapes are constructed and such therefore need not be explained in further detail herein.

Figure 8:
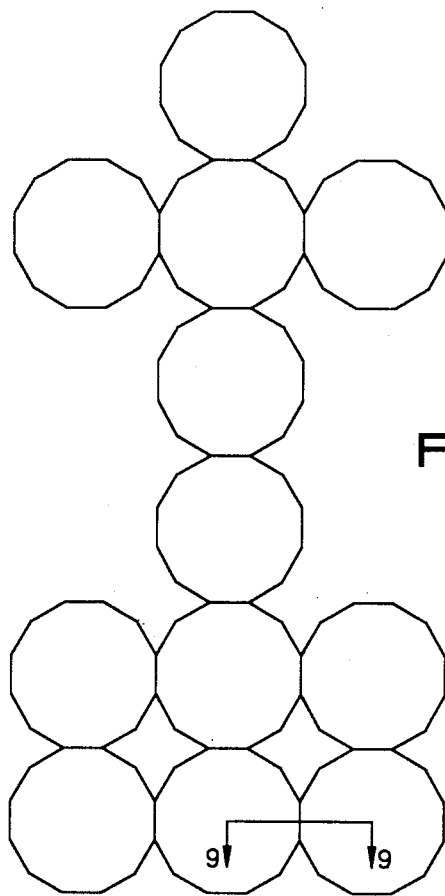
FIG. 8 is a schematic plan view of how the system can be to form a series of adjoining circles.
Figure 9:
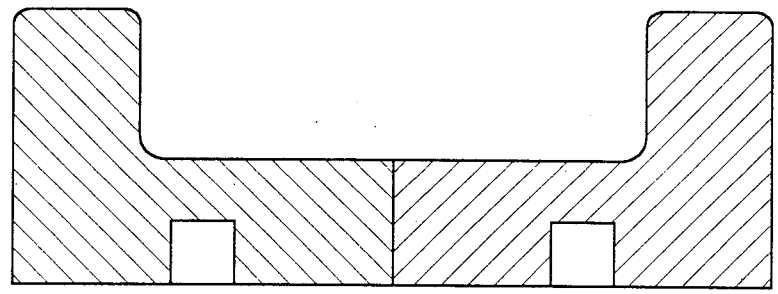
FIG. 9 is a sectional view taken along the section line 9—9 of FIG. 8.

FIG. 8 shows how a plurality of circles using the main bricks 12 may be constructed adjoining each other. This particular type of construction is highly desirable and useful at, for example, a flower show where an exhibitor can place different floral displays in each enclosure and still allow viewers to walk through the spaces between adjacent enclosures. FIG. 9 shows how a walking space for viewers is provided between adjacent enclosures by the constructive form of the bricks. The system shown in FIG. 8, and similar systems, can be constructed in minutes.

It can be seen, therefore, that the present invention is a landscape border brick system which provides the ability to form landscape borders of varying sizes and shapes using only a minimum number of different types of bricks. The system of the present invention also allows individual bricks to be lifted and replaced, even though they are interconnected to prevent the bricks from moving or being dislodged once they have been placed in the desired location.

From the above description of a preferred embodiment of the invention, those skilled in the art will perceive improvements, changes and modifications. Such improvements, changes and modifications within the skill of the art are intended to be covered by the appended claims.

I claim:

1. A twelve-sided enclosed landscape border directly placed on the ground and free of cement or mortar, said landscape border comprising:

twelve identical one-piece V-shaped bricks placed end to end with each other to form said twelve-sided enclosure, each of said one-piece V-shaped bricks having first and second leg portions disposed at a 30° angle to each other; and a plurality of connector pins interconnecting said one-piece V-shaped bricks and securing said one-piece V-shaped bricks together on the ground in a manner such that each of said one-piece V-shaped bricks may be lifted off the ground and off said connector pine without disturbing an adjacent one-piece V-shaped brick;

each of said one-piece V-shaped bricks having an L-shaped cross-sectional configuration and including an outer ground engaging portion and an inner upstanding border portion, said border portion extending upward and generally perpendicular from said ground engaging portion for a distance of about two inches;

said ground engaging portion of each of said one-piece V-shaped bricks having opposite ends and a flat bottom surface placed directly on the ground and extending between said opposite ends, an end surface at each end intersecting said flat bottom surface, first surface means defining a first connector pin recess at one end of said ground engaging portion, and second surface means defining a second connector pin recess at the other end of said ground engaging portion;

each of said connector pin recesses extending from its respective end surface and longitudinally along said flat bottom surface of said ground engaging portion for a distance substantially less than one-half of the length of said ground engaging portion;

each of said connector pin recesses being open to the ground and extending upwardly into said ground engaging portion for no more than one-half of the height of said ground engaging portion;

each said connector pin being of a length substantially equal to the combined lengths of said connector pin recesses at the opposite ends of said ground engaging portion and being located in adjacent connector pin recesses in adjacent one-piece V-shaped bricks and interconnecting said adjacent bricks and securing the bricks together on the ground;

each of said one-piece V-shaped bricks resting by its own weight on the ground and being liftable off the ground and off said connector pins without substantially disturbing any other of said one-piece V-shaped bricks.

2. An angled landscape border placed directly on the ground and free of cement or mortar, said landscape border comprising:

a first one-piece V-shaped brick and a second one-piece V-shaped brick placed end to end with said first brick, each of said one-piece V-shaped bricks having a generally V-shaped configuration with a first leg portion and a second leg portion disposed at a 30° angle to said first leg portion; and a connector pin interconnecting said first and second bricks to secure the bricks together on the ground in a manner such that each of said first and second bricks may be lifted off the ground and off said connector pin without disturbing an adjacent brick;

each of said one-piece bricks having an L-shaped cross-sectional configuration and including an outer ground engaging portion and an inner upstanding border portion, said border portion extending upward and generally perpendicular from said ground engaging portion for a distance of about two inches;

said ground engaging portion of each of said one-piece bricks having opposite ends and a flat bottom surface placed directly on the ground and extending between said opposite ends, an end surface at each end intersecting said flat bottom surface, first surface means defining a first connector pin recess at one end of said ground engaging portion, and second surface means defining a second connector pin recess at the other end of said ground engaging portion;

each of said connector pin recesses extending from its respective end surface and longitudinally along said flat bottom surface of said ground engaging portion for a distance substantially less than one-half of the length of said ground engaging portion;

each of said connector pin recesses being open to the ground and extending upwardly into said ground engaging portion for no more than one-half of the height of said ground engaging portion;

said connector pin being of a length substantially equal to the combined lengths of said connector pin recesses at the opposite ends of said ground engaging portion and being located in adjacent connector pin recesses in said first and second bricks and interconnecting said first and second bricks to secure the bricks together on the ground;

each of said bricks resting by its own weight on the ground and being liftable off the ground and off said connector pins without substantially disturbing said other brick.

* * * * *

UNITED STATES PATENT AND TRADEMARK OFFICE
CERTIFICATE OF CORRECTION

PATENT NO. : 4,986,042

DATED : January 22, 1991

INVENTOR(S) : Anton Richardt

It is certified that error appears in the above-identified patent and that said Letters Patent is hereby corrected as shown below:

Column 6, Line 23, Claim 1, change "pine" to --pins--.

Signed and Sealed this

Fourteenth Day of July, 1992

Attest:

DOUGLAS B. COMER

Attesting Officer Acting Commissioner of Patents and Trademarks